United States Patent [19]
Thomas

[11] 3,934,736
[45] Jan. 27, 1976

[54] SPRING STACKER
[75] Inventor: Kenneth H. Thomas, Oxford, Mass.
[73] Assignee: Webster Spring Co. Inc., Oxford, Mass.
[22] Filed: Aug. 28, 1974
[21] Appl. No.: 501,032

[52] U.S. Cl. ............................. 214/6 FA; 198/162
[51] Int. Cl.² ........................................ B65G 57/14
[58] Field of Search .......... 214/6 FA, 6 F, 6 G, 6 P; 198/117, 154, 158, 162, 165

[56] References Cited
UNITED STATES PATENTS

| | | | |
|---|---|---|---|
| 2,403,942 | 7/1946 | Mathers | 214/6 FA |
| 2,407,782 | 9/1946 | Hardy | 214/6 FA |
| 2,924,342 | 2/1960 | St. Jean et al. | 214/6 FA |
| 3,122,240 | 2/1964 | Steels | 214/6 FA |
| 3,126,106 | 3/1964 | Cain et al. | 214/6 P |
| 3,295,703 | 1/1967 | Schiepe | 214/6 FA |

Primary Examiner—Robert J. Spar
Assistant Examiner—Leslie J. Paperner
Attorney, Agent, or Firm—Robert T. Gammons

[57] ABSTRACT

Apparatus for stacking spring assemblies produced on a machine for making spring assemblies wherein the coils are connected by lacing wire, comprising a table onto which the spring assemblies are discharged, a first conveyor for removing the assemblies from the place of discharge towards a place of stacking, a second conveyor for lifting the successively discharged spring assemblies from the table and placing them in a stack on a dolly, a third conveyor for ejecting the stacked dolly when a predetermined number of spring assemblies have been deposited thereon and drive mechanisms for taking and synchronizing the successive operations.

2 Claims, 11 Drawing Figures

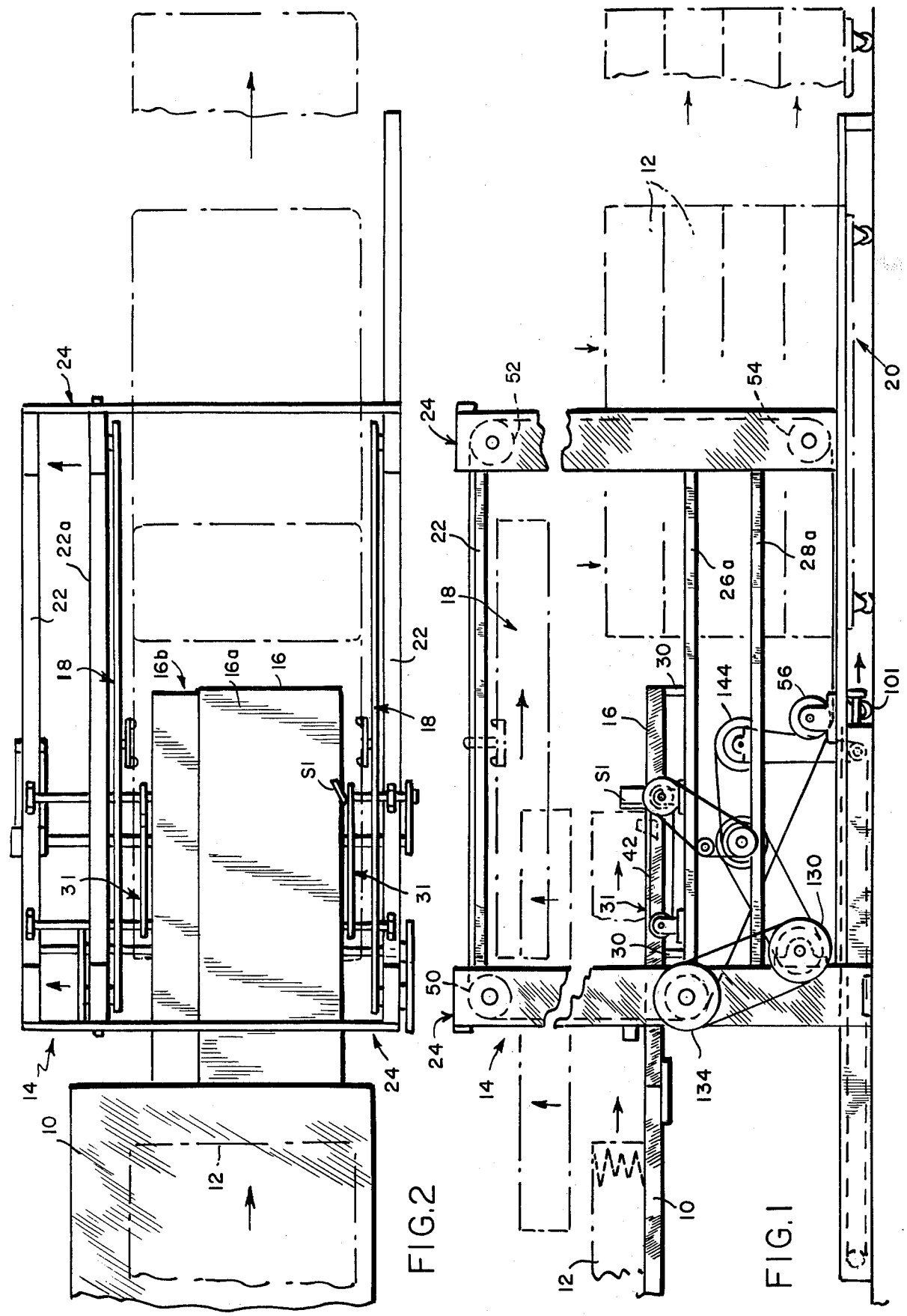

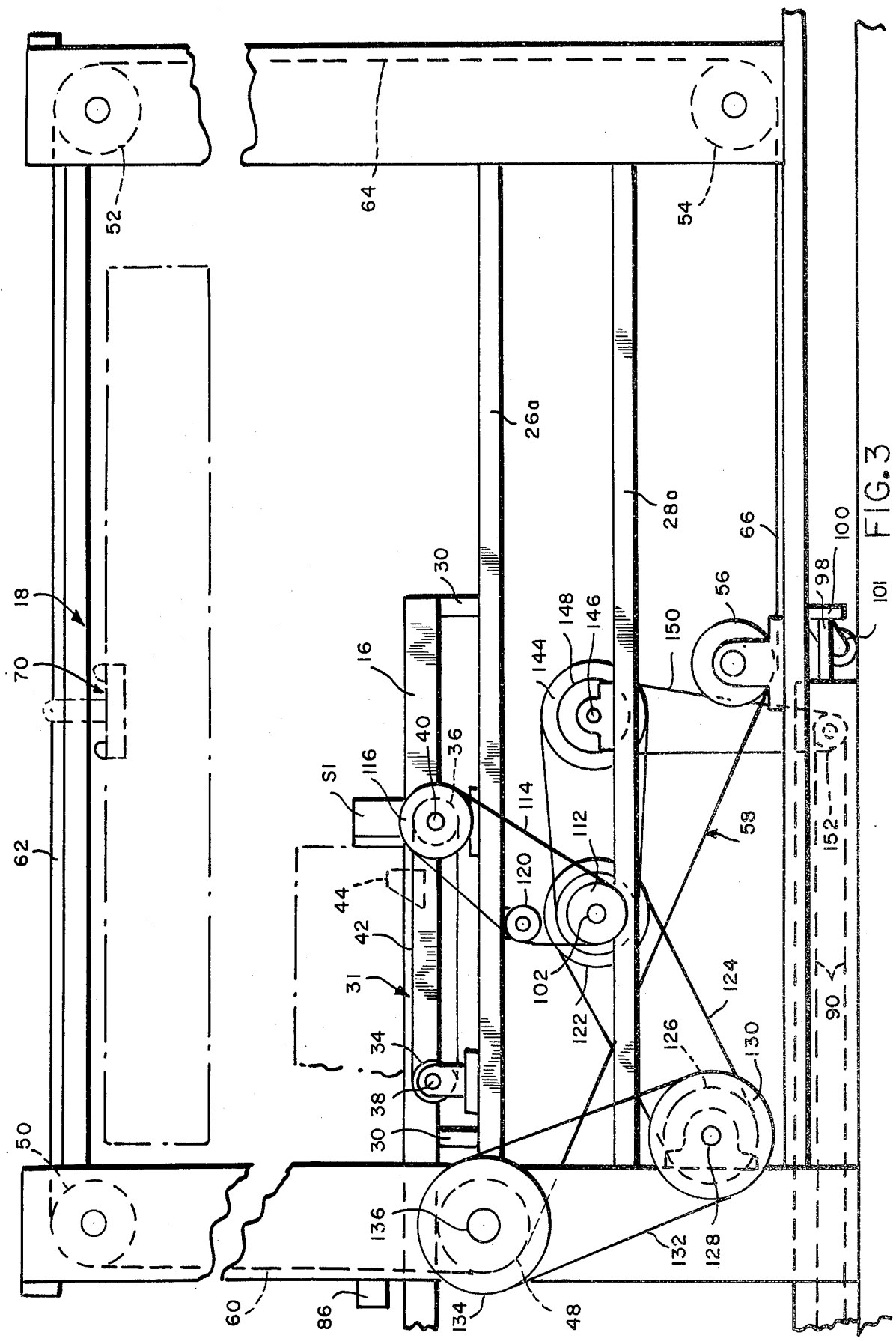

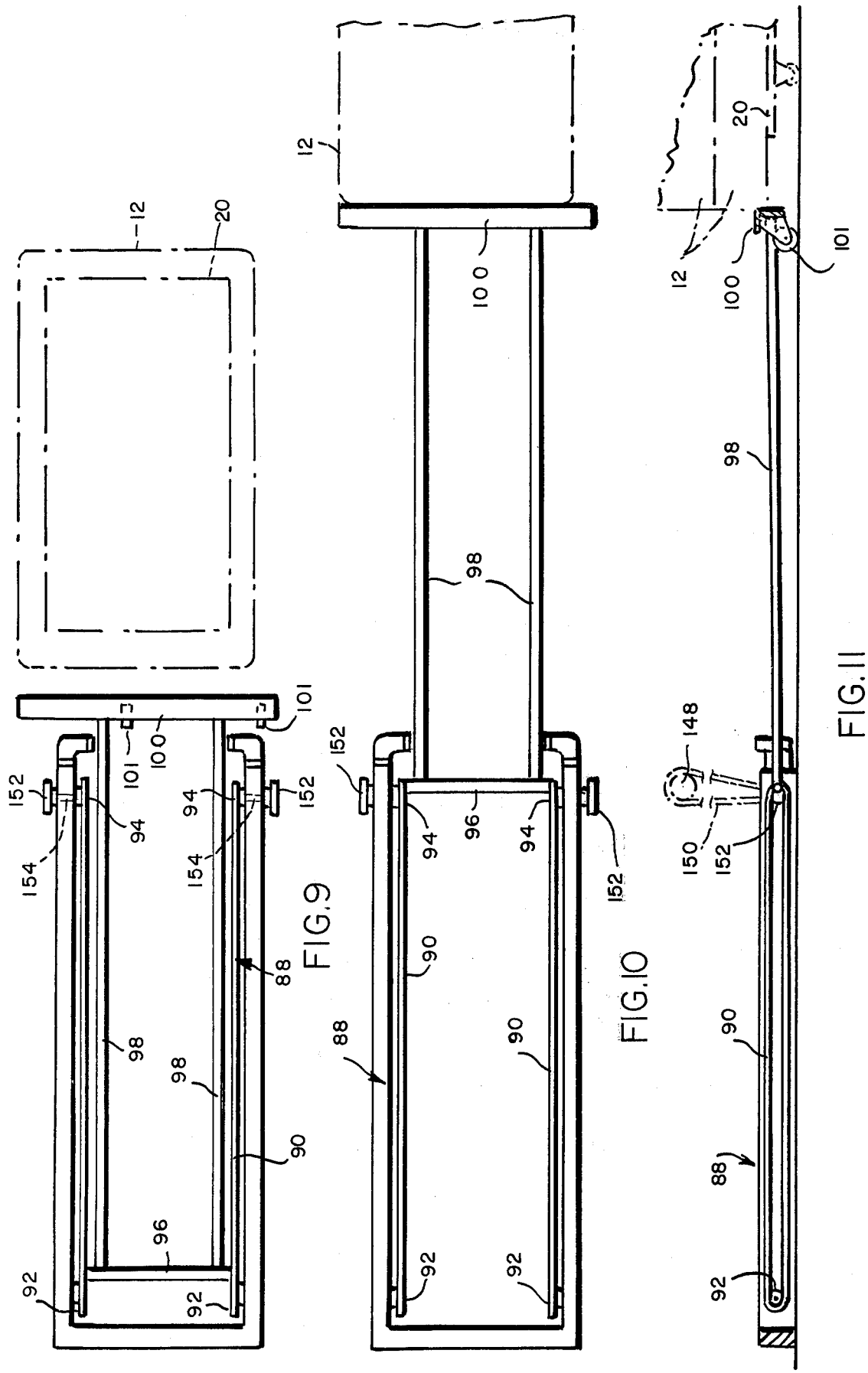

SPRING STACKER

BACKGROUND OF INVENTION

It is customary in the manufacture of spring assemblies to discharge each completed spring assembly from the spring assembly machine onto a platform or apron where it is either removed manually by the operator or his assistant or is permitted to be pushed off onto the floor by the next assembly as the latter is discharged. This is an exceedingly inefficient way of handling the assemblies requiring either that someone be constantly in attendance on the machines to remove the assembly from the platform and stack them on a dolly or that someone be assigned to periodically gather up assemblies allowed to fall to the floor and stack them upon a dolly. The manual handling and stacking of these assemblies is time consuming, arduous and potentially hazardous. The apparatus of this invention is designed to be used in conjunction with a spring assembly machine and particularly at the discharge side thereof for receiving the assemblies as they are discharged and automatically stacking them on a dolly and when a predetermined number have been deposited on the dolly removing the dolly so that it may be wheeled away to a place for storage.

SUMMARY OF INVENTION

As herein illustrated, the apparatus is designed for stacking spring assemblies produced on a spring assembly machine and comprises in line with the discharge side of a spring assembly machine transfer means for receiving assemblies one by one from the spring assembly machine and a dolly upon which the transfer means deposits the assemblies one by one in a stack, said transfer means comprises a table supported at the discharge side of the assembly machine, means arranged along opposite sides of the table and movable along the table for engaging and drawing an assembly forwardly along the table to a predetermined position, means situated at opposite sides of the table below the level of the top of an assembly resting on the table at a position substantially midway between the leading and trailing ends of the assembly movable upwardly relative to the sides of the assembly to engage and lift the assembly from the table, move it forwardly to a position above the dolly, lower it into engagement with the dolly and return to said predetermined position, means for ejecting the dolly when a predetermined number of assemblies are stacked thereon, and a counter actuated by return of said last means to said position to count the number of assemblies and when a predetermined number of assemblies is reached to effect operation of the means for ejecting the dolly. The table is narrower than the spring assembly so that the longitudinal sides of the spring assemblies extend beyond the sides of the table and the means movable along the sides of the table for advancing the spring assemblies therealong comprise conveyor chains supported with portions parallel to the table and below the laterally extending portions of the spring assembly and upstanding dogs on the chains for engagement with said laterally extending portions of the spring assemblies. The table is comprised of telescoping parts to enable adjusting the width of the table for spring assemblies of different size and one of the conveyors is adjustable relative to the other width-wise of the apparatus according to the adjusted width of the table. The means for lifting the spring assemblies from the table for movement forwardly and deposit on the dolly comprise hooks supported for rectilinear movement from a predetermined position below the top of an assembly resting on the table, vertically upward, horizontally forward to a position above the dolly, vertically downward to a position below the top of an assembly deposited on the dolly and then back to said position. Rectilinear movement of the hooks is effected by switch means actuated by movement of an assembly to said predetermined position on the table. Conveyor chains provide for rectilinear movement of the hooks and the latter are pivotally suspended thereon for free swinging movement in the planes of the chains. The hooks are pivotally supported on the hangers for angular movement from vertical positions to positions inclined inwardly and upwardly relative to path of movement of the chains and there is means for supporting the hooks in their vertical positions until they near the top of an assembly resting on the table and then for releasing them for engagement with the assembly. The hooks become automatically released from the assembly as they are moved downwardly relative to the dolly following deposit of the assembly on the dolly. The means for ejecting the dolly comprises a ram and conveyor chains to effect reciprocation thereof. There is a continually driven main drive shaft which drives the first means, a first clutch operable by operation of the switch to initiate operation of the means for removing the assemblies from the table and depositing them on the dolly and a second clutch operable by the counter to initiate operation of the means for ejecting the dolly. Each clutch when actuated traverses the conveyor with which it is associated one turn.

The invention will now be described in greater detail with reference to the accompanying drawing, wherein:

FIG. 1 is a side elevation of the stacking apparatus of this invention;

FIG. 2 is a plan view;

FIG. 3 is a side elevation to larger scale omitting the assembly forming apparatus at the one end and the dolly at the other end to show the drive;

FIG. 9 is a plan view taken on the line 9—9 of FIG. 1 with the ejecting means withdrawn;

FIG. 10 is a view showing the ejection means extended and

FIG. 11 is an elevation of FIG. 10.

Figure 4:
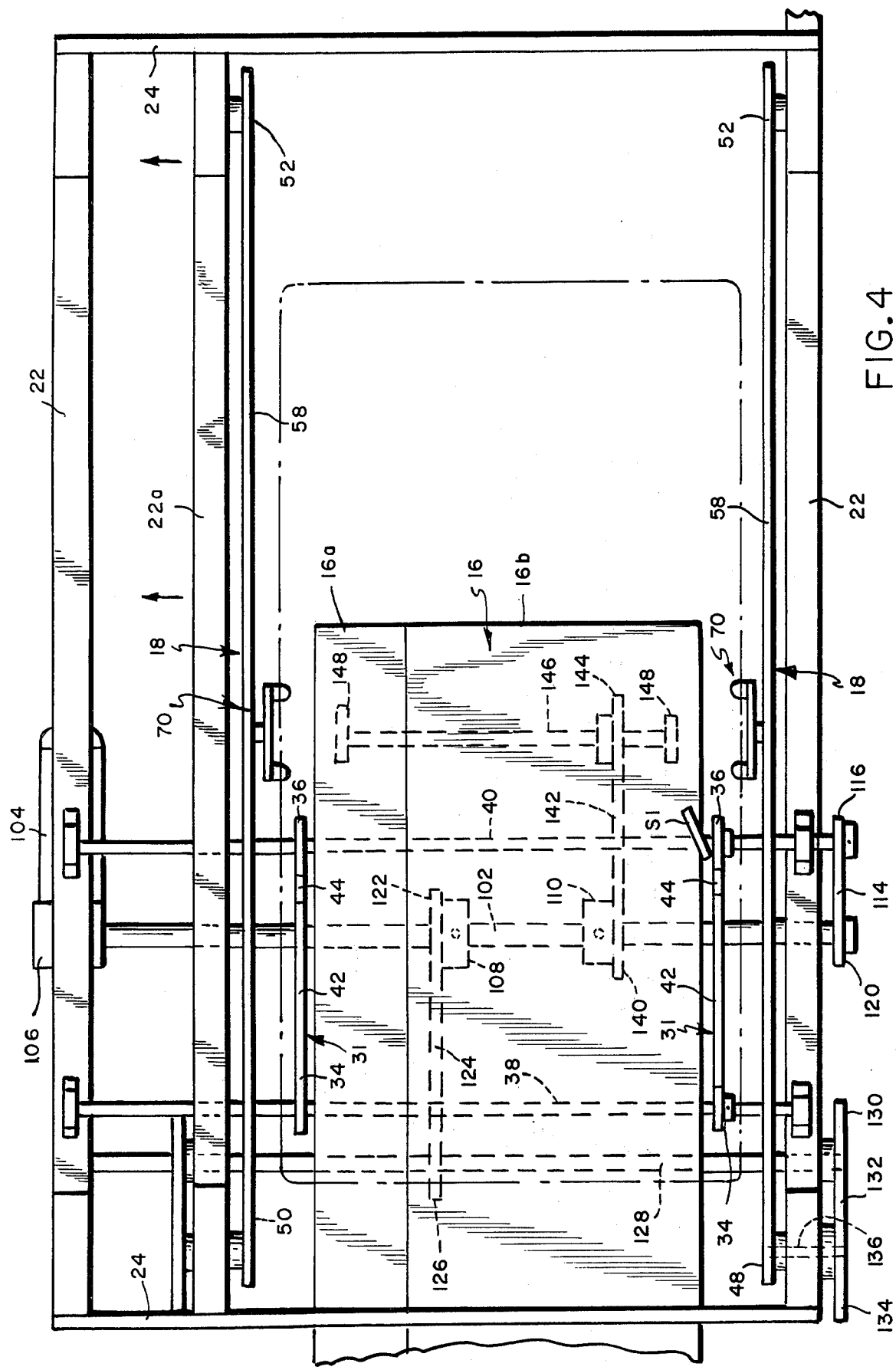
FIG. 4 is a plan view of FIG. 3.

Referring to the drawings, FIGS. 1 and 2, there is shown a discharge platform or apron 10 of a spring assembly machine and in dot and dash lines a portion of a spring assembly 12 resting on the apron.

The apparatus of this invention is designed to be used in conjunction with spring assembly machines and is placed at the end of the discharge apron 10 and comprises a frame 14 which supports a table 16 at the level of the apron for receiving assemblies from the apron and conveyors 18—18 for automatically removing the assemblies from the table and stacking them on a dolly 20 resting on the floor by means of which they may be trundled away for storage or shipment.

The frame 14 comprises rectangularly arranged sides and ends 22—22 and 24—24. Intermediate the top and bottom of the frame there are at opposite sides longitudinally extending beams 26ª—26ª, 28ª—28ª. Bars 30—30 are mounted transversely of the structure on the beams 26ª—26ª and these support the table 16. The table 16 is comprised of telescopically interengaged parts 16ª, 16ᵇ, FIG. 4, to enable adjusting the width of the table according to the width of the assembly. In conjunction with the adjustable table there is provided an adjustable side 22ª which is supported at its opposite ends in the ends 24—24 for adjustment transversely of the frame between the sides 22—22.

Conveyors 31—31 are provided at opposite sides of the table for moving the assemblies along the table. Each conveyor comprises a pair of longitudinally spaced sprockets 34-36 mounted on transversely extending shafts 38 and 40 journaled at their opposite ends on the sides 22—22 and a chain 42 entrained about the sprockets. The sprockets at the near side of the table are fixed and those at the far side adjustable along the shafts according to the width of the table. The width of the table is adjusted so that the opposite sides of the spring assembly projects at opposite sides of the table above the conveyors 31—31 and there are lugs 44—44 on the conveyor chains movable in translation with the conveyors into engagement with the undersides of the assemblies to draw the assemblies forwardly on the table. As related heretofore, there are conveyors 18—18 designed to lift the assemblies from the table, move them forwardly and then deposit them on the dolly. Operation of the conveyors 18—18 is initiated by a switch S1 mounted on the table so as to be engaged by a spring assembly as it is moved forwardly on the table. Each conveyor 18 comprises sprockets 48, 50, 52, 54 and 56 mounted on the inner side of the frame 22 and the frame 22ª and a chain 58 entrained about the sprockets. As thus arranged the conveyors have vertical runs 60 which extend from the sprockets 48 below the table upwardly to the sprockets 50 above the table, horizontal runs 62 which extend from the sprockets 50 parallel to the top of the table to the sprockets 52, vertical runs 64 which extend from the sprockets 52 downwardly the sprockets 54 below the table and a return run 66 which extend from the sprockets 54 horizontally along the lower part of the frame under sprockets 56 and then upwardly to the sprockets 48.

Figure 7:
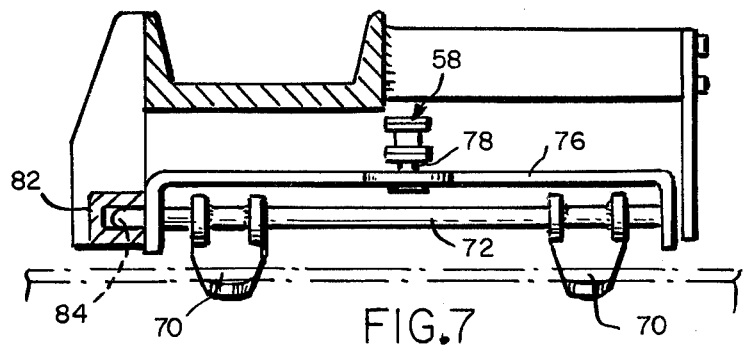
FIG. 7 is a view looking downwardly on FIG. 6.
Figure 5:
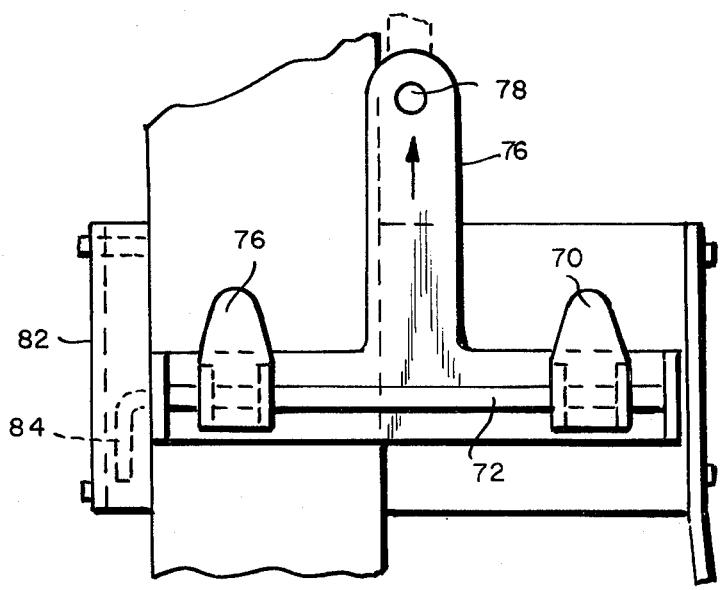
FIG. 5 is a fragmentary elevation showing one of the hooks for engaging the spring assembly.
Figure 6:
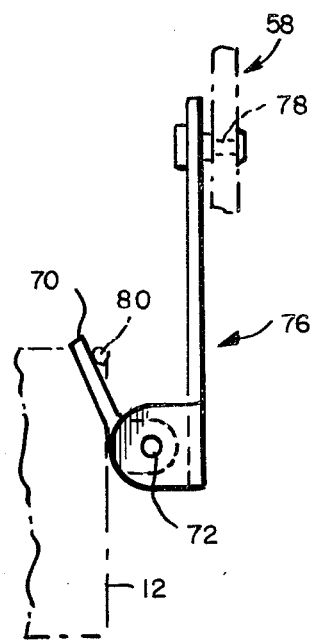
FIG. 6 is an end view of FIG. 5 showing a hook engaged with the spring assembly.
Figure 8:
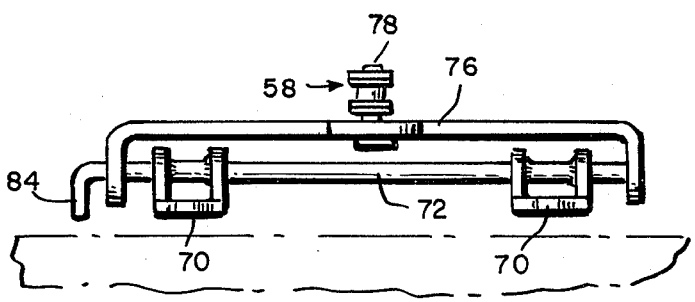
FIG. 8 is a view looking downwardly on FIG. 5.

The conveyors move in vertical planes close to the opposite sides of the spring assembly resting on the table and carry hooks 70—70 which are adapted to the sides of the assemblies as they are moved upwardly along the vertical runs 60 to lift the spring assemblies from the table, move forwardly along the horizontal runs 62 parallel to the table and then downwardly along the vertical run 64 to deposit the assembly on the dolly. The hooks 70—70 are mounted rods 72—72, FIGS. 6 to 8, journaled at their opposite ends in the lower parts of stirrups 76—76 which are pivotally connected to the chain 58 by pins 78—78. The hooks 70—70 are mounted on the inner sides of the stirrups and normally hang inwardly with respect to the chains as shown in FIG. 6. It is desirable that these hooks engage the top wires 80 of the assemblies to lift them from the table and so while these hooks are traveling upwardly from the underside of the table along the sides of the spring assemblies they are held retracted by guides 82—82 within which bent ends 84—84 of the rod 72—72 are confined. When the bent ends move out of the upper ends of the guides as the hook nears the top of the spring assemblies they are allowed to tip inwardly and hence to become engaged with the undersides of the wires 80 as shown in FIG. 6. Since the hooks are pivotally suspended on the chains 58 the spring assemblies will be carried upwardly, balanced in a substantially horizontal position, then moved forwardly parallel to the top of the table and finally downwardly towards the dolly. When the spring assemblies come to rest on the dolly or a previously deposited spring assembly the continued downward movement of the conveyors automatically disengages the hooks from the spring assemblies whereupon they are moved forwardly to their initial positions in readiness for the next spring transferring operation.

Operation of the conveyors 18—18 is initiated each time that a spring assembly is moved into position by a switch S1 which is placed so as to be engaged by the forward end of the spring assembly in a position such that the spring assembly will extend about equally forwardly of the hooks and rearwardly of the hooks so as to insure that when assembly is lifted by the hooks from the table it will be substantially in balanced equilibrium.

The stirrups 76—76 are so pivotally attached to the chains that as they pass over the pulleys they are free to swing downwardly and thus maintain the horizontal position of the assembly throughout its movement.

A counter 86, FIG. 3, is mounted in a position to be engaged by the stirrup at one side as it is moved back to its initial position in readiness for the next operation and this operates when a predetermined number of springs have been stacked to actuate means for initiating operation of ejection means 88 located at the base of the frame for ejecting the loaded dolly. The ejector means 88 as shown in FIGS. 9, 10 and 11 comprise a pair of conveyor chains 90—90 entrained about sprockets 92-96. The chains 90—90 have secured between them a rod 96 to which are connected a pair of spaced parallel rods 98—98 at the distal ends of which there is a bar 100. Wheels 101—101 support the bar 100. In the retracted position of the rods 98—98 as shown in FIG. 9 the bar 100 is located to the left of the dolly 20. When the counter initiates operation of the conveyors 88 the latter move the rods 98—98 from their retracted position as shown in FIG. 9 to their extended position as shown in FIGS. 10 and 11 to cause the bar 100 to push the stack of assemblies supported on the dolly 20 away from the frame of the machine so that it may be easily wheeled away. The conveyors 88 make one complete cycle so as to retract the bar 100 to its initial position whereupon the operator moves an empty dolly into place for the next loading. It is within the scope of the invention to employ means for discharging loaded dollies and replacing them with empty dollies automatically.

The drive mechanism for the apparatus as herein illustrated is disclosed most clearly in FIGS. 3 and 4. The drive is provided for by a constantly driven main drive shaft 102 supported in suitable bearings transversely of the frame driven by a constant speed motor 104 with suitable reduction gearing 106 therebetween. There are a pair of air operated clutches 108-110 on this shaft. On the end of the drive shaft 102 opposite the motor, that is, on the forward end of the shaft as disclosed in FIG. 4, there is a drive sprocket 120 and this sprocket has entrained about it one end of a chain 114, the other end of which is entrained about a sprocket 116, fixed to the shaft 40 on which are mounted the sprockets 36—36, thus the conveyor chains 42—42 are continuously driven while the machine is in operation. Idlers 120—120 provide for maintaining the chains taut. Alternately, a clutch may be employed to connect the sprocket 120 to the shaft 102 and a switch mounted on the table in a position to be engaged by an assembly as it is discharged from the assembly machine to initiate operation of the chains 42—42.

When the switch S1 is engaged by the leading end of an assembly it actuates the clutch 108 which locks a sprocket 122 associated therewith to the drive shaft 102 and this by way of a chain 124 and sprocket 126 effects rotation of the shaft 128, also mounted transversely of the frame in suitable bearings. Shaft 128 has on one end a sprocket 130—130 about which are entrained the ends of chains 132—132, the other ends of which are entrained about sprockets 134—134 fixed to shafts 136—136 on which are mounted the sprockets 48—48 thus providing for driving the conveyors 18—18.

When the counter reaches a predetermined count a switch, not shown, associated therewith actuates the air clutch 110 and this clutches a sprocket 140 to the drive shaft 102. A chain 142 is entrained at one end about the sprocket 140 and at its opposite end about a sprocket 144 on a shaft 146. Sprocket 148—148 on the shaft 146 by way of chains 150—150 drives sprockets 152—152, fixed to shafts 154—154, on which are mounted the sprockets 94—94. This provides for driving the conveyor chains 90—90. The air clutch 110 will remain engaged long enough to effect extension and retraction of the bar 100 to expel the dolly from the apparatus.

It should be understood that the present disclosure is for the purpose of illustration only and includes all modifications or improvements which fall within the scope of the appended claims.

I claim:

1. Apparatus for stacking spring assemblies produced on a spring assembly machine, comprising in line with the discharge side of the spring assembly machine, transfer means for receiving assemblies one by one from the spring assembly machine and a dolly upon which the transfer means deposits the assemblies one by one in a stack, said transfer means comprising a table supported at the discharge side of the assembly machine, said table being comprised of telescoping parts for adjusting the width of the table for springs of different widths, means arranged along opposite sides of the table and movable along the table for engaging and drawing an assembly forwardly along the table to a predetermined position, lifting means situated at opposite sides of the table below the level of the top of an assembly resting on the table at an initial position substantially midway between the leading and trailing ends of the assembly, said lifting means being movable upwardly relative to the sides of the assembly to engage and lift the assembly from the table, move the assembly forwardly to a position above the dolly, lower the assembly onto the dolly and return the lifting means to said initial position, means for ejecting the dolly when a predetermined number of assemblies are stacked thereon, and a counter actuated by return of said lifting means to said initial position to count the number of assemblies and when said predetermined number of assemblies is reached to effect operation of the means for ejecting the dolly.

2. Apparatus for stacking spring assemblies produced on a spring assembly machine, comprising in line with the discharge side of the spring assembly machine, transfer means for receiving assemblies one by one from the spring assembly machine and a dolly upon which the transfer means deposits the assemblies one by one in a stack, said transfer means comprising a table supported at the discharge side of the assembly machine, said table being comprised of telescoping parts for adjusting the width of the table for springs of different widths, means arranged along opposite sides of the table and movable along the table for engaging and drawing an assembly forwardly along the table to a predetermined position, comprising conveyor chains supported with portions parallel to the top of the table and upstanding dogs on the chains for engagement with the assembly, one of said conveyor chains being adjustable relative to the other widthwise of the apparatus according to the adjusted width of the table, lifting means situated at opposite sides of the table below the level of the top of an assembly resting on the table at an initial position substantially midway between the leading and trailing ends of the assembly, said lifting means being movable upwardly relative to the sides of the assembly to engage and lift the assembly from the table, move the assembly forwardly to a position above the dolly, lower the assembly onto the dolly and return the lifting means to said initial position, means for ejecting the dolly when a predetermined number of assemblies are stacked thereon, and a counter actuated by return of said lifting means to said initial position to count the number of assemblies and when said predetermined number of assemblies is reached to effect operation of the means for ejecting the dolly.

* * * * *